(12) United States Patent
Dhoolam et al.

(10) Patent No.: US 10,812,408 B1
(45) Date of Patent: Oct. 20, 2020

(54) PREVENTING CONCENTRATED SELECTION OF RESOURCE HOSTS FOR PLACING RESOURCES

(71) Applicant: Amazon Technologies, Inc., Seattle, WA (US)

(72) Inventors: Surya Prakash Dhoolam, Seattle, WA (US); Christopher Magee Greenwood, Seattle, WA (US); Mitchell Gannon Flaherty, Seattle, WA (US); Danny Wei, Seattle, WA (US); Nachiappan Arumugam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 15/081,646

(22) Filed: Mar. 25, 2016

(51) Int. Cl.
*H04L 12/911* (2013.01)

(52) U.S. Cl.
CPC ................................ *H04L 47/78* (2013.01)

(58) Field of Classification Search
CPC ..... H04L 47/78; H04L 47/781; H04L 47/782; H04L 47/783; H04L 47/784; H04L 47/785; H04L 47/786; H04L 47/787; H04L 47/788
See application file for complete search history.

(56) References Cited

U.S. PATENT DOCUMENTS

| 7,197,433 | B2 | 3/2007 | Patel et al. | |
|---|---|---|---|---|
| 8,019,870 | B1* | 9/2011 | Eppstein | H04L 41/5051 709/220 |
| 8,365,183 | B2 | 1/2013 | Esfahany et al. | |
| 8,706,869 | B2 | 4/2014 | Campion et al. | |
| 8,762,538 | B2 | 6/2014 | Dutta et al. | |
| 2002/0165979 | A1* | 11/2002 | Vincent | G06Q 40/04 709/239 |
| 2008/0320005 | A1* | 12/2008 | Jager | G06F 16/182 |
| 2012/0324070 | A1* | 12/2012 | Campion | G06F 9/5066 709/223 |
| 2013/0111468 | A1* | 5/2013 | Davis | G06F 9/5077 718/1 |
| 2013/0297964 | A1* | 11/2013 | Hegdal | G06F 11/0712 714/2 |

(Continued)

OTHER PUBLICATIONS

U.S. Appl. No. 14/642,445, filed Mar. 9, 2015, Marc John Brooker.

*Primary Examiner* — Umar Cheema
*Assistant Examiner* — James Ross Hollister
(74) *Attorney, Agent, or Firm* — Robert C. Kowert; Kowert, Hood, Munyon, Rankin & Goetzel, P.C.

(57) ABSTRACT

A distributed system may implement preventing concentrated selection of resource hosts for placing resources within the distributed system. When a request to place a resource at a resource host is received, an evaluation of load metrics for the resource host is made with respect to rejection criteria. If the rejection criteria is satisfied, then the resource host may reject the request to place the resource. If the rejection criteria is not satisfied, then the resource host may not reject the placement of the resource. Rejection criteria may be provided to resource hosts along with the placement request, in some embodiments. Rejection criteria may be changed, weakened, or removed entirely if initial attempts to place a resource are unsuccessful.

20 Claims, 8 Drawing Sheets

(56) References Cited

U.S. PATENT DOCUMENTS

| | | | |
|---|---|---|---|
| 2015/0127834 A1* | 5/2015 | Udupi | G06F 9/5044 709/226 |
| 2015/0236977 A1* | 8/2015 | Terayama | G06F 9/5077 709/224 |
| 2016/0182397 A1* | 6/2016 | McFarlin | H04L 41/5051 709/226 |
| 2017/0149687 A1* | 5/2017 | Udupi | H04L 67/1002 |

* cited by examiner

US 10,812,408 B1

PREVENTING CONCENTRATED SELECTION OF RESOURCE HOSTS FOR PLACING RESOURCES

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage or other virtual computing resources, various different placement optimizations and/or constraints may be implemented in order to provide performance guarantees. When placing resources amongst resource hosts, selecting from among different placement options that satisfy the optimizations and/or constraints to place storage may prove challenging. Moreover, the impact of placement decisions upon resource hosts themselves may be difficult to discern.

Figure 1:
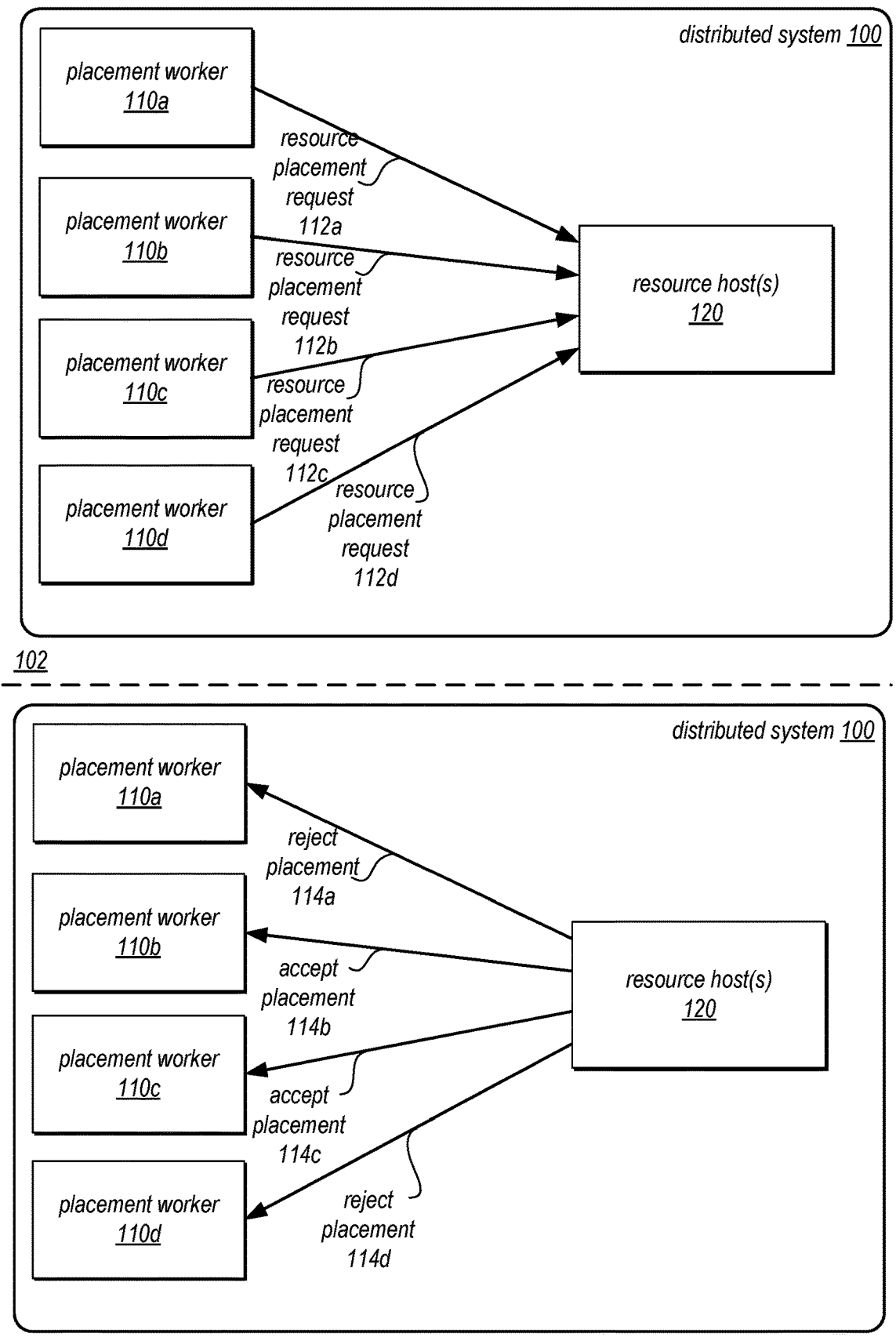
FIG. 1 illustrates a logical block diagram of preventing concentrated selection of resource hosts for placing resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement preventing concentrated selection of resource hosts for placing resources. Distributed systems may host various resources for performing or implementing different systems, services, applications and/or functions. Some resources may be part of a larger distributed resource, located at multiple resources amongst different resource hosts. Other resources may be individual or stand-alone. Resources may be one of many different types of resources, such as one of various types of physical or virtualized computing resources, storage resources, or networking resources. For example, a storage service may host different replicas of data across a number of different resource hosts.

Placement decisions may be made according to placement criteria, in some embodiments. Placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., different infrastructure zones such as network router or brick). If no such location is available, then the placement criteria may indicate a less optimal location to place the resource (e.g., a resource host that is in a less efficient infrastructure zone, such as a different network router or brick than another resource with which the placed resource communicates). Placement criteria may include, but are not limited to, a configuration of the resource along with other resources if part of a distributed resource, available bytes, IOPs, or slots, a resource utilization balance, such as bytes to IOPs balance, impact on capacity fragmentation, hardware/software characteristics, and/or various desired location-based configurations.

Employing placement criteria to determine optimal placements for individual resources can lead to scenarios where a few optimal locations are repeatedly selected for placement of resources, resulting resource placements being concentrated at the few optimal placement locations. Placing a new resource at a location is not without cost. For instance, placing existing data volumes in new locations utilizes network and I/O bandwidth to obtain data and then write the data to a storage location at the resource host. If a resource host is frequently selected based on the placement criteria, the resource host may be unable operate efficiently due to the costs associated with accepting many new resource placements. By applying rejection criteria at resource hosts to prevent concentrated selection of resource hosts, resource placements may be better distributed without negating the positive effects of employing placement criteria to determine optimal resource placements.

FIG. 1 illustrates a logical block diagram of preventing concentrated selection of resource hosts for placing resources, according to some embodiments. Distributed system 100 may implement a resource host 120 (a computing system, like computing system 1000 in FIG. 8) which may be one of many resource hosts implemented by distributed system 100. However due to various factors, resource host 120 may be an optimal location for placing many resources in distributed system 100. For instance, resource host 120 may be implemented on a new server just added to a fleet of servers running the resource hosts for distributed system 100, and is optimal for placement as it may have a large available capacity for hosting resources. Many distributed systems parallelize certain critical operations in order to ensure that operations do not have to wait on other operations to be performed. As illustrated in scene 102, in the case of resource placement, many distributed systems, such as distributed system 100 may implement multiple placement workers, workers 110a, 110b, 110c, and 110d, which may be assigned different resources to place. As each worker 110 may independently attempt to place a resource, resource host 120 may be likely selected by many or all of the placement workers as a prime candidate for placing a resource. For example, placement workers 110 may evaluate multiple resource hosts of distributed system 100 with respect to placement criteria and each may independently conclude that resource host(s) 120 is an optimal location to place a resource. As such resource host 120 may receive many requests 112 from the different workers 110 to place a corresponding resource.

Although resource host 120 may be capable of hosting most or all of the requested resources, the cost of placing the resource on the resource host may render resource host 120 very inefficient for a significant period of time, which would provide poor service to currently hosted resources and resources to be hosted at resource host 120. Instead resource host 120 may prevent concentrated selection, as illustrated in scene 104 by selectively declining certain requests for placement (e.g., accepting placements 114b and 114c, and rejecting placements 114a and 114d) by evaluating the placement requests with respect to rejection criteria. Rejection criteria may include any combination of one or more conditions, measures, states, thresholds, or scenarios that may be evaluated utilizing load metrics or other information describing the resource host, including example thresholds for I/O utilization, processing utilization, network utilization threshold, or a threshold for a number of resources currently being placed at the resource host.

In order to determine whether to accept or reject a placement, resource host 120 may evaluate the criteria for rejecting resource placements with respect to various load metrics determined for resource host(s) 120. For instance, the placement of a resource at a resource host can consume limited hardware capacity, such as I/O bandwidth. Load metrics may then be collected or evaluated which are indicative of the utilization of I/O bandwidth. Consider a scenario where a resource being placed is a data volume at a resource host with limited I/O bandwidth (e.g., a limited number of threads for handling I/O requests to currently hosted resources and requests to place new resources at the resource host). To place the resource, a backup version of the data volume has to be accessed and copied to the resource host, consuming I/O bandwidth to read and write the data volume from the backup version. Additionally, the resource host may also host other data volumes which are available and accessed by clients of the other data volumes. Servicing access requests to the available data volumes may also utilize the same bandwidth. Load metrics may be collected, in such a scenario, which reflect the I/O consumption of already accepted placements (e.g., the cost of performing I/O to read and write data for new data volumes). For instance, the number of stalls, delays, or other failures to obtain data from the backup store (e.g., data retrieval faults) may be collected as a load metric. The rejection criteria for the resource host may include a threshold or other condition with respect to utilization of the I/O bandwidth (e.g., a threshold indicating a number of data retrieval faults detected in a given time period). If a requested placement is received, and the number of data retrieval faults exceeds the threshold, then the request may be rejected.

Figure 6:
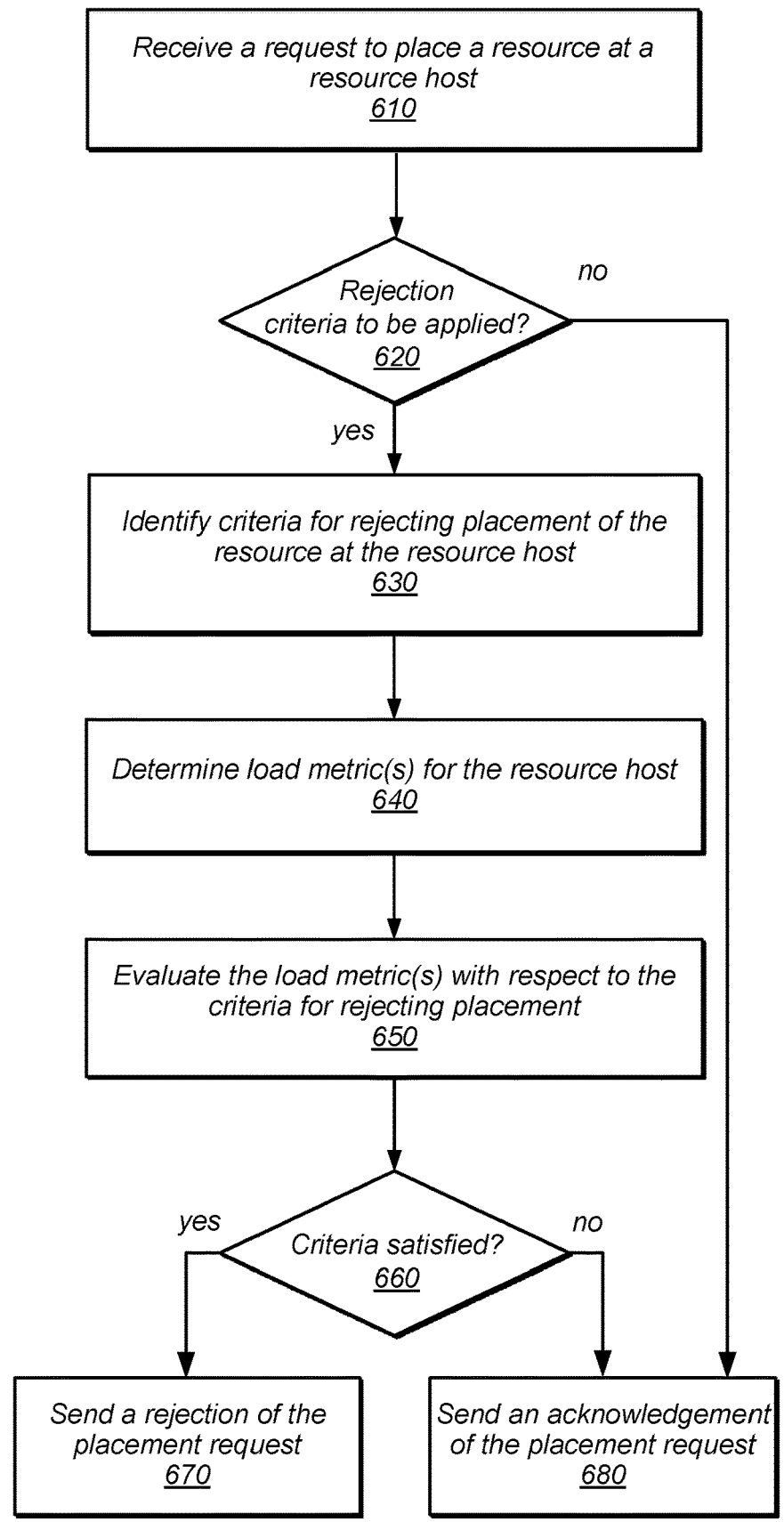
FIG. 6 is a high-level flowchart illustrating various methods and techniques for preventing concentrated selection for resource hosts for placing resources, according to some embodiments.
Figure 7:
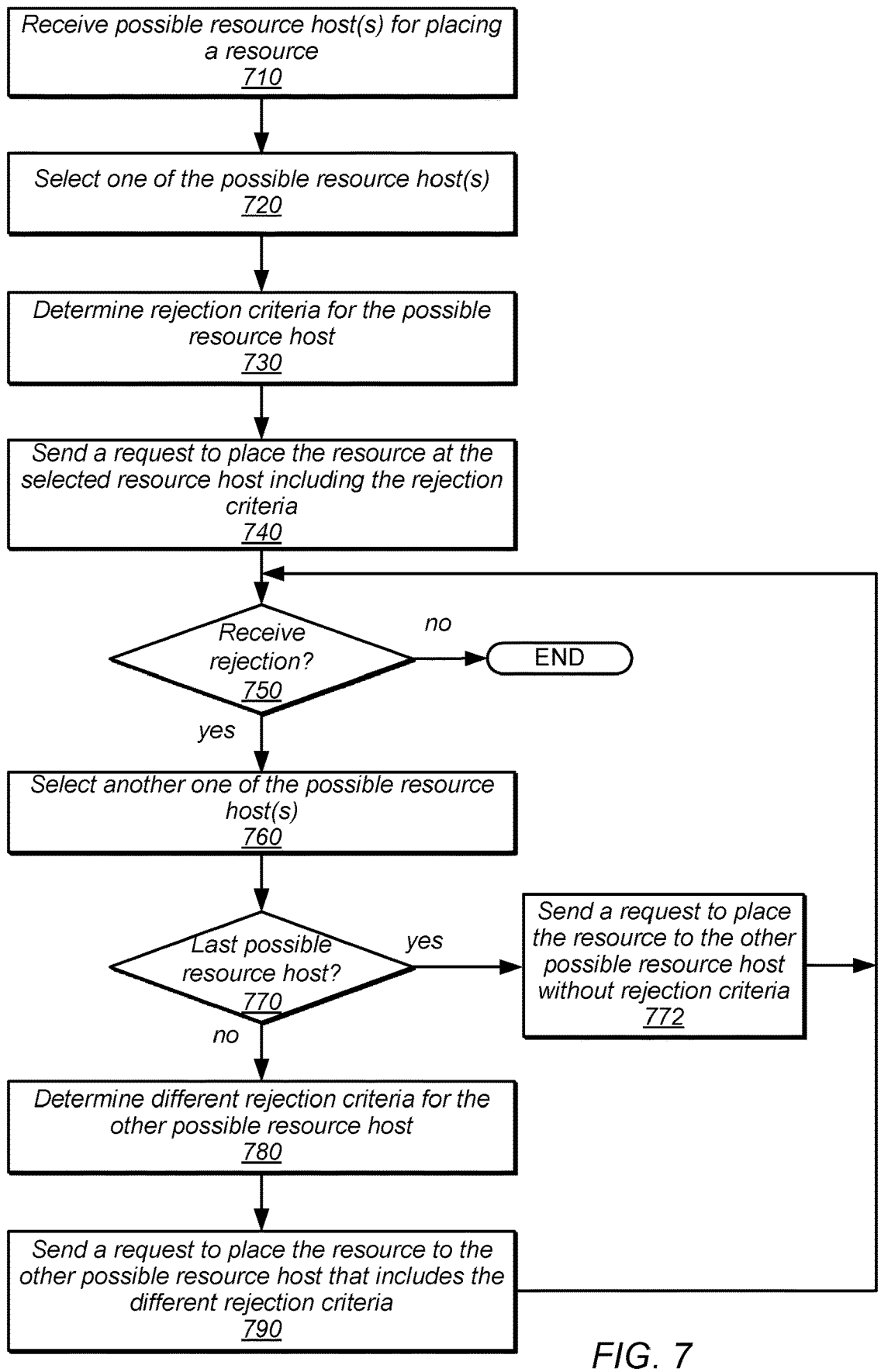
FIG. 7 is a high-level flowchart illustrating various methods and techniques for selecting criteria for rejecting the placement of resources, according to some embodiments.

Generally, rejection criteria may be evaluated using various load metrics for the resource host, such as the number of current resource requests or any indication of the workload, utilization, or other description of the performance of a resource host or an infrastructure locality that the resource host is implemented within. FIGS. 6 and 7, discussed below, provide many examples of selecting and evaluating rejection criteria which may be implemented by a host like resource host 120. In some embodiments, a cost or workload associated with placing the resource may be determined. If the determined cost or workload exceeds a rejection criteria threshold, then concentration avoidance may be enforced by applying rejection criteria. However, if the cost or workload threshold is not exceeded, then acceptance of the resource placement request may not be burdensome, and the request may be accepted without evaluating the rejection criteria with respect to the resource request.

By allowing resource hosts, such as resource host 120, to enforce rejection criteria, distributed system 100 is freed from tracking the current load on resource hosts to prevent concentration of placement requests to any particular resource host. Though such metrics could be collected and maintained, resource hosts may operate in dynamic environments so that the load for individual resource hosts may change continuously. A centralized store of information would then have to be disseminated to the many components (e.g., placement workers 110) providing the parallelized placement of resources, which would be costly in terms of network bandwidth and in computing resources to ensure a consistent view of load metrics across a fleet of resource hosts. Instead, resource host(s) 120 can make rejection determinations based on load metrics that are locally collected and maintained, without introducing further costs to centrally store and disseminate load metrics for the purposes of preventing concentrated placement of resources.

Please note that previous descriptions are not intended to be limiting, but are merely provided as an example of preventing concentrated selection for resource hosts for placing resources.

This specification begins with a general description of a provider network, which may implement preventing concentrated selection for resource hosts for placing resources offered via one or more network-based services in the provider network, such as data volumes offered via a block-based storage service. Then various examples of a block-based storage service are discussed, including different components/modules, or arrangements of components/module that may be employed as part of volume placement for data volumes in the block-based storage service including components that may prevent concentrated selection for resource hosts for placing data volumes. A number of different methods and techniques to implement preventing concentrated selection for resource hosts for placing resources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
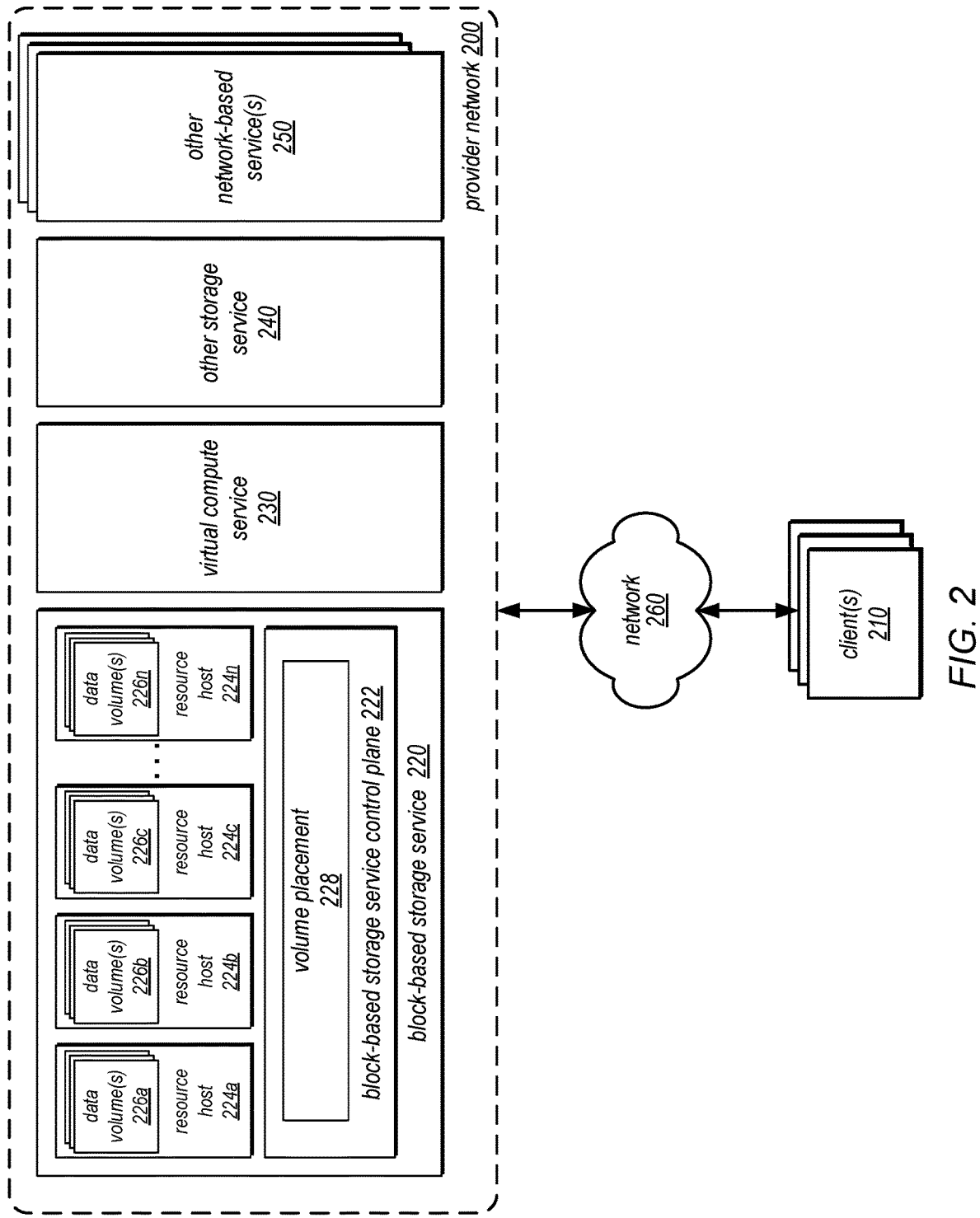
FIG. 2 is a block diagram illustrating a provider network implementing multiple network-based services including a block-based storage service that places resources, according to some embodiments.

FIG. 2 is a block diagram illustrating a provider network implementing multiple network-based services including a block-based storage service that places resources, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240. New copies of the data volume may then be created from the snapshot, resulting in a new placement request for the data volume. As the data volume would have to be retrieved and copied to a new resource host, the workload or cost associated with accepting a request to place the data volume created from a snapshot may trigger concentration avoidance techniques, such as those discussed below, to prevent one resource host from accepting too many requests to place data volumes created from snapshots.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane 222 may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
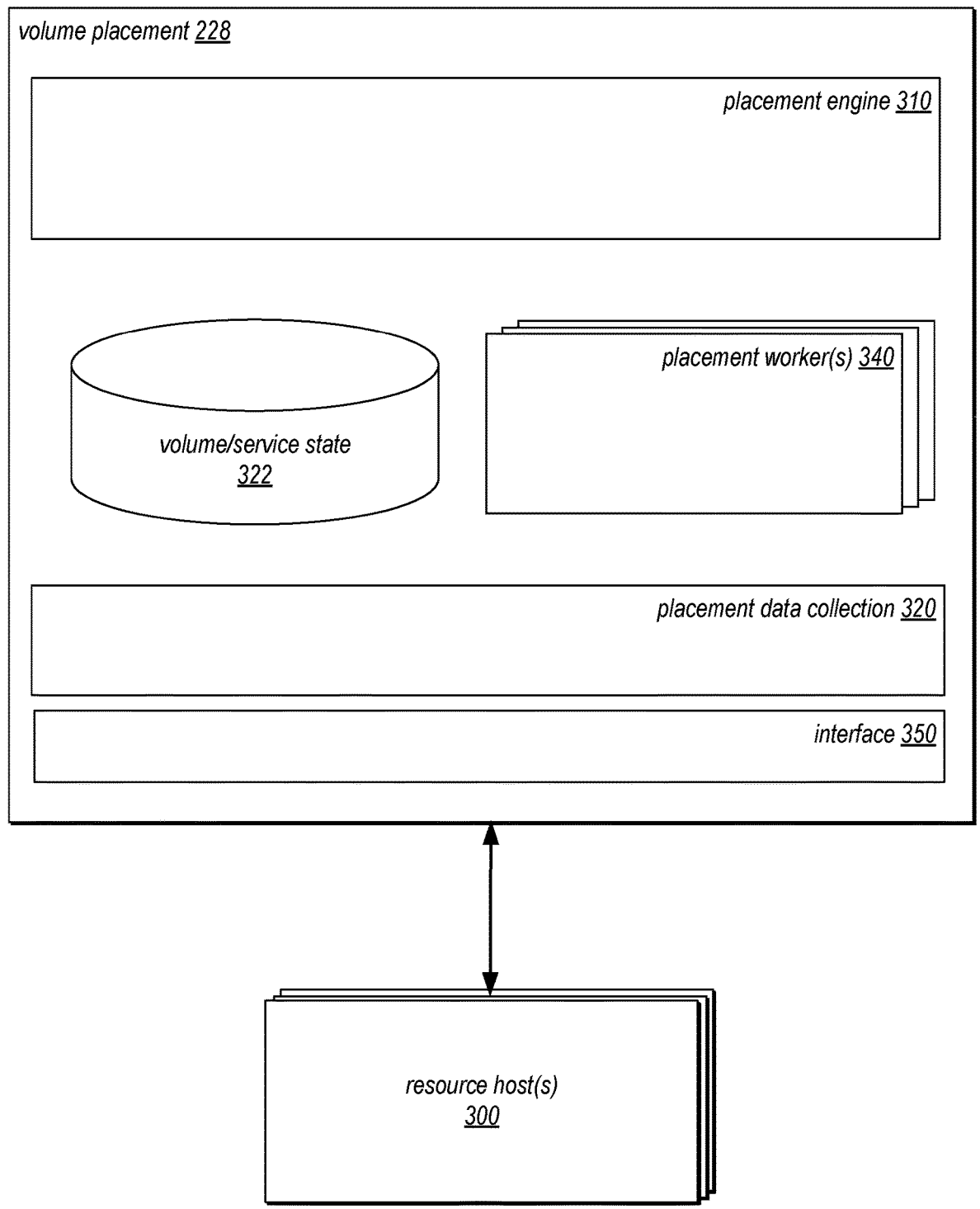
FIG. 3 is a logical block diagram illustrating volume placement for the block-based storage service that implements preventing concentrated selection of resource hosts, according to some embodiments.

FIG. 3 is a logical block diagram illustrating volume placement that implements opportunistic resource migration to optimize resource placement, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 8). Each resource host may maintain respective replicas of data volumes. Some data volumes may differ in size from other data volumes, in some embodiments. Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within different infrastructure localities. Infrastructure localities may be defined by devices, such as server racks, networking switches, routers, or other components, power sources (or other resource host suppliers), or physical or geographical locations (e.g., locations in a particular row, room, building, data center, fault tolerant zone, etc.). Infrastructure localities may vary in scope such that a resource host (and replicas of data volumes implemented on the resource host) may be within multiple different types of infrastructure localities, such as a particular network router or brick, a particular room location, a particular site, etc.

Block-based storage service control plane 222 may implement volume placement 228, in various embodiments. Volume placement 228 may be implemented at one or more computing nodes, systems, or devices (e.g., system 1000 in FIG. 8). In at least some embodiments, volume placement 228 may implement placement data collection 320 to collect information, metrics, metadata, or any other information for performing volume placement. Placement data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, placement data collection 320 may aggregate the data according to infrastructure localities, partitions, resource hosts, or other granularities for block-based storage service 220. Placement data collection 320 may store the data at volume/service state store 322, which may persistently maintain the collected data. In some embodiments volume/service state store 322 may be implemented as a database or otherwise searchable/query-able storage system to provide access to other components of volume placement 228 or block-based storage service control plane 226.

Volume placement 228 may implement placement engine 310, in various embodiments. Placement engine 310 may perform various kinds of analysis to identify placement locations for resources, such as replicas of new data volumes or migrating currently placed data volumes. Analysis may be performed with respect to the placement criteria, discussed above, to determine placement locations which may be optimal for individual resources, or for the block-based storage service as a whole. For instance, placement engine 310 may implement configuration analysis to evaluate prospective placement configurations of all of the resources in a distributed resource, such as the placement of master, slave(s) of a data volume. In some embodiments, a client or other user of a distributed resource (or resource of the distributed resource) may be considered in the configuration analysis (e.g., evaluating the placement configuration including a virtual instance attached to a data volume). Configuration analysis may consider the impact of migrating currently placed resources to other resource hosts in order to free up space at resource hosts that would provide better configurations for other resources of a distributed resource (e.g., move a slave volume to another host to make room for a different slave volume at the host which would be in the same infrastructure zone as a master of the volume or a client of the volume).

In response to receiving a placement request at placement engine 310, configuration analysis may determine prospective placements by accessing volume/service state 322. Those resource hosts which are available, and which do not violate any placement constraints may be evaluated (e.g., two partitions of a data volume cannot be hosted by the same resource host, resource hosts with enough capacity, or resource hosts that implement particular hardware and/or software). In some embodiments, a subset of available resource hosts may be evaluated for placement decisions (as evaluating a very large pool of available resource hosts may be too computationally expensive). Prospective placement configurations may be generated or identified based on the available resource hosts for the resource. Other replicas of the data volume may be evaluated based on actual or hypothetical placement locations.

One or more infrastructure zone localities may be determined for the different prospective placement configurations of a distributed, in various embodiments, based on volume/service state 332. For instance, metadata may indicate which network bricks or routers the resource hosts of different replicas of a data volume are connected to. In at least some embodiments, a score may be generated for the infrastructure zone locality of a prospective placement configuration (where the resource to be placed is located at a different available resource host). Placement engine 310 may perform configuration analysis upon many other metrics, data, or considerations besides infrastructure zone localities. For example, in at least some embodiments, an analysis may be performed on prospective configurations with respect to different performance metrics of the resource hosts hosting the replicas of a data volume. For example, storage capacity, workload, or Input/Output Operations per second (IOPs), may be evaluated for the data volume as a whole. Some data volumes may be partitioned so that different partitions maintain different portions of data for a data volume. For example, a data volume may be partitioned into 3 sets of master-slave replica pairs. Configuration analysis may be performed based on the placement configuration for each portion of the data volume that is replicated (e.g., each master-slave replica pair) or all of the data volume partitions (e.g., all 3 of the master-slave replica pairs).

Placement engine 310 may implement other analyses to determine partition placements, as well. For example, scores may be generated for placements based on the last time a particular resource host was contacted or heard from. Analysis may be performed to identify and prevent multiple master-slave replica pairs from being placed on the same two resource hosts. In some embodiments, resource host fragmentation analysis may be performed, to optimize placement of resources on resource hosts that can host the partition and leave the least amount of space underutilized. As with configuration analysis above, the example analysis given above may be performed to determine placement locations for some resources which if migrated would provide better placement of other resources that were not moved.

In addition to making placement recommendations, placement engine 310 may, in various embodiments, determine selection criteria to be included in placement requests sent by placement worker(s) 340. For example, placement engine 310 may provide a list of placement recommendations and include with each recommended placement a different rejection criteria (or no rejection criteria). As noted above, rejection criteria may be selected in various ways to ensure that no one resource host 300 is overburdened with placement request (e.g., by including thresholds identifying the number of currently placed resources of a given type or workload/cost, such as data volumes created from snapshots or other remote storage locations). In some embodiments, placement engine 310 may select rejection criteria based on performance metrics and other information describing the resource hosts in volume/service state store 322. For example, if a resource host has one metric exhibiting a higher utilization than others (e.g., processor utilization), then placement engine 310 may include a selection criteria for the resource host to evaluate whether placement of the resource may exceed some utilization threshold for the processor.

Placement worker(s) 340 may be a pool of compute nodes, dedicated hardware, and/or other systems of computing systems or devices that direct the placement of data volumes for a block-based storage service. Placement worker(s) 340 may receive a placement task specific to a data volume to be placed (e.g., including a data volume characteristics or other information describing the data volume). Once a task is received placement worker(s) 340 may continue to attempt to place the requested data volume until successful). However, in some embodiments, placement worker(s) 340 may determine that placement of the resource is optional (e.g., a migration operation to move the data volume from one resource host to another) and, in response, abort any further attempts to place the data volume. As described below, placement worker(s) 340 may request candidate or possible placement locations from placement engine 310 in order to place a data volume at an optimal location among resource host(s) 300. Placement worker(s) 340 may perform various techniques, such as those discussed below with regard to FIG. 7, to include rejection criteria when sending requests to resource host(s) 300 via interface 350.

Figure 4:
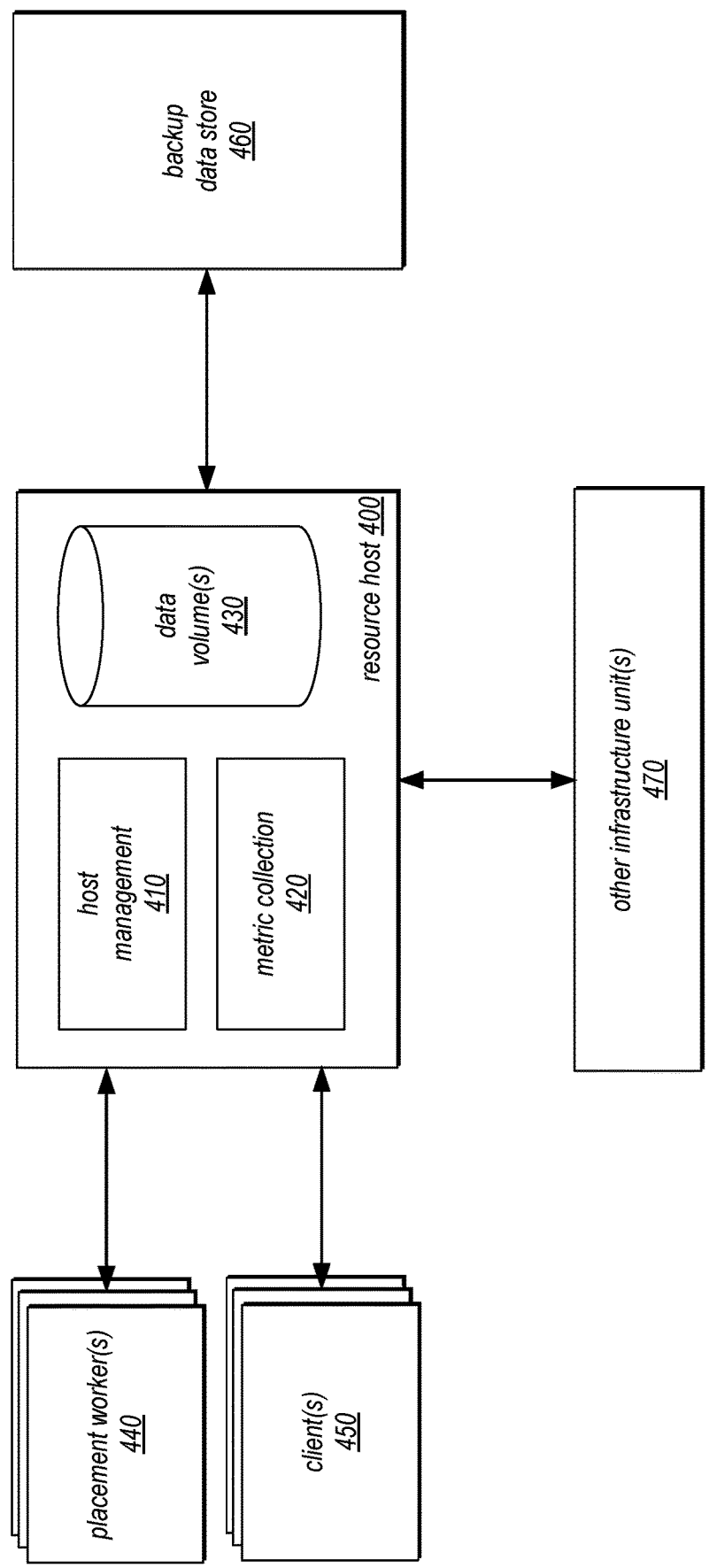
FIG. 4 is a logical block diagram illustrating a resource host that prevents concentrated selection, according to some embodiments.

FIG. 4 is a logical block diagram illustrating a resource host that prevents concentrated selection, according to some embodiments. As noted above, resource hosts may provide block-based persistent storage in order to store data volumes 430 on behalf of clients 450. Resource host 400 may implement host management 410 to handle access requests from client(s) 450 as well as requests to manage data volumes, including the creation of new data volumes to be placed at resource host 400 by placement worker(s) 440. Resource host 400 may access backup data store 460 (e.g., a data store maintaining snapshots or other portions of existing data volumes, such as an object store or other storage service 240 in FIG. 2) to copy data from existing data volumes in order to create a new copy of the data volume at resource host 400. Host management 410 may implement the various techniques discussed below with regard to FIG. 6 in order to accept or reject placement/creation requests for data volumes using rejection criteria and load metrics determined by metric collection 420.

Resource host 400 may also implement metric collection 420 to collect, calculate, track, determine, and or maintain load metrics for resource 400. For example, such metrics may include the number of attempts to acquire data from backup data store 460 in order to create a data volume 430 have failed, the queue or buffer size of outstanding I/O requests, whether from client(s) 450 or from host management 410 to get data from backup data store 460, the latency of successful requests to get data from backup data store 460, the number of data volume(s) 430 already placed and being created at resource host 400, or any other indication of the workload, utilization, or other description of the performance of resource host 400. In some embodiments, metric collection 420 may determine load metrics for different infrastructure unit(s) 470 or localities of which resource host 400 is a part (e.g., network traffic directed to a server rack implementing the server on which the resource host is running, or a network router connected to the server).

Figure 5:
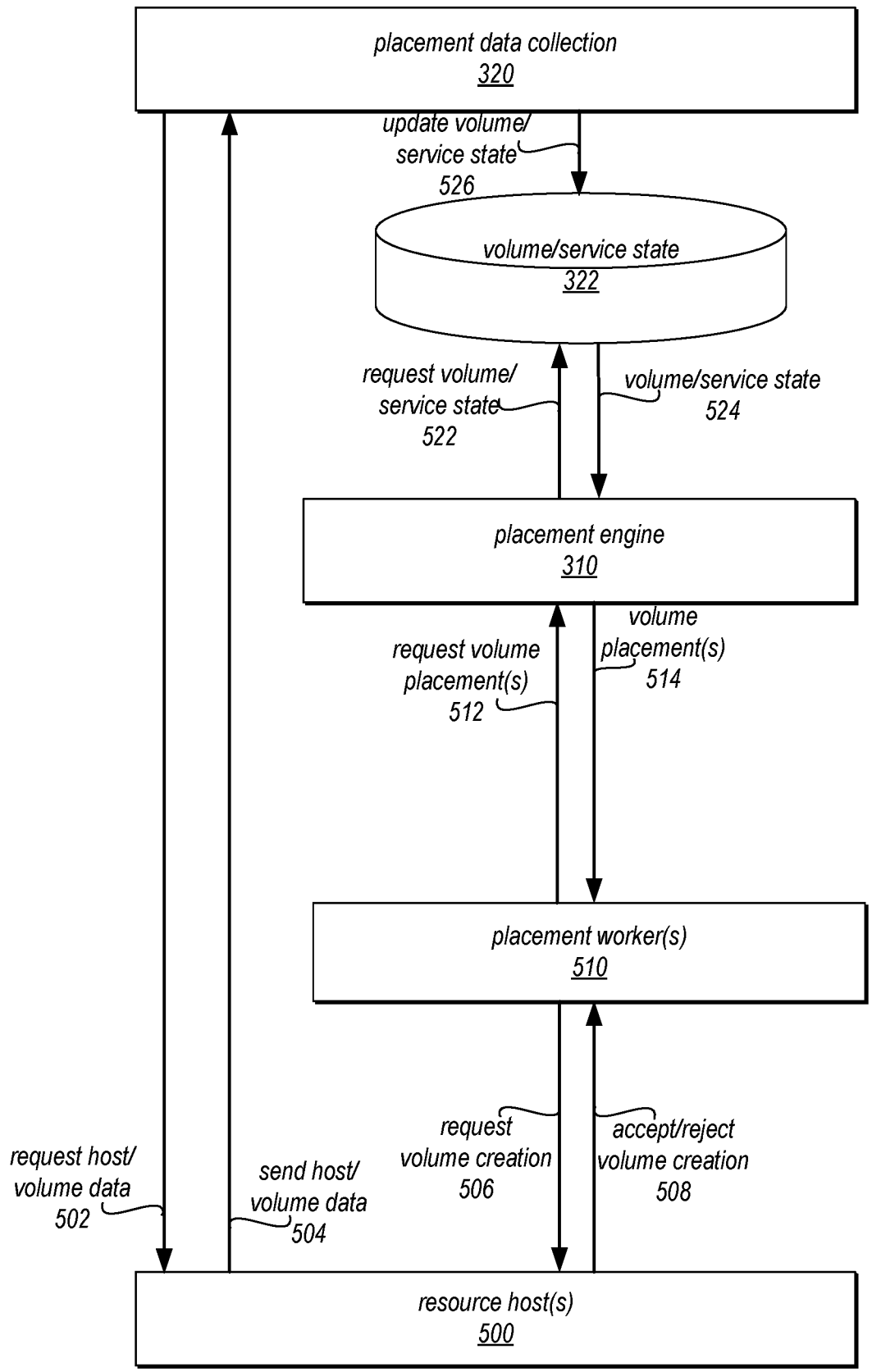
FIG. 5 illustrates interactions between volume placement and resource hosts to place resources and prevent concentrated resource host selection, according to some embodiments.

FIG. 5 illustrates interactions between volume placement and resource hosts to place resources and prevent concentrated resource host selection, according to some embodiments. As discussed above, placement data collection 320 may sweep or request host/volume data 502 from resource host(s) 500 in order to update volume service state 322. Resource host(s) 500 may send host/volume data 504 to placement data collection 320, which may aggregate and/or update volume/service state 526. Placement engine 310 may request volume service state 522 from volume service state store 322 in order to generate placement recommendations based on received volume service state 524. Placement worker(s) 510 handling requests to place new data volumes may request possible data volume placements 512 from placement engine 310. Placement engine 310 may perform many of the different analysis techniques discussed above to optimize placement of the data volume in the distributed system.

Placement worker(s) 510 may take the received volume placement possibilities 514 generated as a result of performing the placement techniques and begin sending placement requests 506 to the resource hosts 500 for the possible placements. In addition to receiving placement recommendations from placement engine 310, placement workers may also receive rejection criteria (e.g., thresholds or other conditions) to include in requests to create volume. Resource host(s) 500 may then sending a notification of acceptance or rejection of the volume creation request 508 according to the rejection criteria. Placement worker(s) 510 may continue request placement for a data volume until successful, implementing techniques, such as the backoff technique described below with regard to FIG. 7.

The examples of preventing concentrated selection for resource hosts for placing resources discussed above with regard to FIGS. 2-5 have been given in regard to a block-based storage service and/or other network-based services. Various other types or configurations of distributed systems placing resources of distributed resources at resource hosts may implement these techniques. Different configurations of the various modules, components, systems, and or services described above that may implement network locality-based throttling may be configured to prevent concentrated selection for resource hosts for placing resources. FIG. 6 is a high-level flowchart illustrating various methods and techniques for preventing concentrated selection for resource hosts for placing resources, according to some embodiments. These techniques may be implemented using resource host, a control plane component, or other system or device for placing resources at resource hosts in a distributed system, as described above with regard to FIGS. 2-5.

As indicated at 610, a request may be received to place a resource at the resource host. The request may include various metadata describing the resource (e.g., hardware requirements, client information, configuration data, etc.) which a resource host may first check to see if the host is capable of providing. If not (e.g., the host has no free capacity), then the resource host may reject the placement request (not illustrated). However for those requests to place resources where the resource host is capable of hosting the resource, the resource host may implement techniques to prevent concentrated selection of the resource host. For instance, as indicated at 620, the resource host may determine the cost or workload of placing the resource at the resource host. Resource types, for instance, such as whether or not the resource is a new data volume or a data volume created from a snapshot may indicate the cost or workload of placing a resource. Resources created from remote sources or complicated initialization/configuration workflows may be more costly to accept for placement than types of resources that do not rely upon remote systems or costly processes to initialize. Thus, in some embodiments, concentrated selection techniques may be limited to certain types of resources. For instance, consider the data volume resources discussed above with regard to FIGS. 2-5. Data volumes may be new and thus contain no data. Placement requests for new data volumes are easy to accept as creation of the new data volume requires minor metadata changes, resource allocations, etc. However, for placing an existing data volume that already contains data on a resource host, the existing data volume may have to be copied from a remote source, consuming network and I/O bandwidth to retrieve and store the existing data volume (e.g., from a backup store). Thus, for those resource placement requests for resources where the workload or cost of placing the resource does not indicate that rejection criteria is to be evaluated for the request, the resource host may always accept the placement request (if the resource host is capable of hosting the data volume), and may send an acknowledgement of accepting the placement request, as indicated at 680.

For those resources where rejection criteria is to be applied (or in embodiments where all placement requests are subject to rejection criteria) the resource host may identify criteria for rejecting placement of the resource at the resource host, as indicated at 630. In some embodiments, the resource host itself may select the criteria for rejecting a resource placement request. For instance, the resource host may tracking the number of current resources being created on the resource host and set a threshold which if a placement request exceeds, then the placement request may be rejected. However, as discussed below with regard to FIG. 7, criteria for rejecting placement can be determined by a control plane and included in the request to place the resource host. Rejection criteria may be any combination of conditions, measures, states, thresholds, or scenarios that may be evaluated utilizing load metrics or other information describing the resource host. Consider an example where rejection criteria can include a threshold condition (e.g., number of resources being currently created) and a state condition (e.g., magnetics disk-based storage). The rejection criteria may specify that satisfying either condition or both conditions may result in satisfying the rejection criteria to reject resource placement. Accordingly, rejection criteria can be tailored to prevent placement in many different scenarios.

As indicated at 640, load metrics may be determined for the resource host, in various embodiments. Load metrics may be any indication of the workload, utilization, or other description of the performance of a resource host or an infrastructure locality that the resource host is implemented within. For example, load metrics may include the number of placement/creation operations ongoing, the latency or speed of performing operations (e.g., how long it takes to retrieve a portion of data from a remote data store), the number of resources hosted, processor, memory, or storage utilization at the host, the network traffic directed to an infrastructure locality such as a server rack or network routing device (e.g., network brick) which the server is implemented on/connected to. Resource hosts may track such load metrics, determine them when a placement request is received, and/or request them from other sources (e.g., server rack or network brick metrics from health monitoring service or component for the distributed system).

As indicated at 650, the resource host may evaluate the load metrics with respect to the criteria for rejecting the resource placement, in some embodiments. If a threshold is utilized for the rejection criteria, for instance, then the applicable metric for the threshold (e.g., number of resource creations ongoing), may be compared with the threshold. If the threshold is exceeded (and any other conditions to be satisfied are met), then the rejection criteria may be considered satisfied, as indicated by the positive exit from 660, and a rejection of the placement request sent, as indicated at 670. In some embodiments, the rejection may indicate the rejection criteria or particular condition of the rejection criteria which failed (e.g., so that a control plane may understand the rejection and generate a different version of rejection criteria that may not be met for another attempt at placing the resource). If the rejection criteria is not satisfied, then as indicated by the negative exit from 660, an acknowledgement of the placement request indicating acceptance of the placement may be sent, as indicated at 680.

As noted above, a resource host or control plane component for a distributed system may select the criteria for rejecting placement of a resource. In at least some embodiments, a control plane may be solely responsible for selectin rejection criteria. In this way, rejection criteria may be tuned to provide an effective deterrent for over concentrated selection of resource hosts, without negating the beneficial effects of a resource placement strategy that is prone to selecting the same resource hosts when placing resources. FIG. 7 is a high-level flowchart illustrating various methods and techniques for selecting criteria for rejecting the placement of resources, according to some embodiments.

In order to place a resource, a control plane may identify possible resource host(s) for placing the resource, as indicated at 710. Possible resource host(s) may be chosen or generated by a placement engine or technique that optimizes various performance, efficiency, or other goals, such as the many different placement techniques discussed above with regard to FIG. 3. For example, to meet certain availability guarantees, placement techniques may select as possible resource hosts those resource hosts located within a common infrastructure locality (e.g., connected to a same networking device or hosted at a same server rack). Of these possible resource host(s) that are identified, a control plane may select one of the possible resource host(s), as indicated at 720. For instance, the possible resource hosts may be ordered from most optimal placement to least so that selecting the next host in the list provides the next best placement selection in turns of optimality.

As indicated at 730, rejection criteria may be determined for the possible resource host. If, for instance, the resource host has certain underlying hardware capabilities (e.g., type of storage, such as magnetic or flash-based, processing capacity, network capacity, etc.), then rejection criteria may be selected that are indicative of the limitations of the resource host with respect to one or more of the underlying hardware capabilities. For example, when placing data volumes, as discussed above with regard to FIGS. 2-5, volume placement engine 310 may determine rejection criteria that indicate whether placement of a data volume would exceed the I/O capacity of the resource host to provide access to the data volume (as well as other data volumes at the host). Once determined, the rejection criteria may be included in a placement request for the resource sent to the selected resource host, as indicated at 740.

The resource host may send back a response based on an evaluation of the rejection criteria (as discussed above with regard to FIG. 6). If an acknowledgment of accepting the placement of the resource is received (no rejection), then as indicated by the negative exit from 750, placement is complete. However, if, as indicated by the positive exit from 750, a rejection of the placement is received, then another placement may be attempted. For example, as indicated at 760, another one of the possible resource host(s) may be selected, such as the next-most optimal resource host for placement of the resource. If this host is the last possible resource host to tried for placement, then a request to place the resource at the host may be sent without the rejection criteria, as indicated at 772, which the selected resource host may be obliged to accept. In this way, a resource is not ultimately refused placement somewhere, even if the accepted location is sub-optimal.

If, however, the resource host is not the last possible resource host, as indicated by the negative exit from 770, then a different version of the rejection criteria may be determined for the other resource host, as indicated at 780. For example, if the rejection criteria includes threshold values which if exceeded identify the placement request for rejection, the threshold values may be increased so as to make it more difficult to satisfy the rejection criteria. In some embodiments, a different version of the rejection criteria may include adding additional criteria which have to be met in order to reject the placement request. In some embodiments, the different version of the rejection criteria may be a weakened or less strict version of rejection criteria, which if iteratively weakened as a result of no placement acceptance may effectively implement a backoff mechanism for allowing resource hosts to reject a placement request so that at a final resource may be prevented from rejecting the resource placement request using rejection criteria. The different version of the rejection criteria may then be included in a request to place the resource sent to the other possible resource host, as indicated at 790. Based on the response, as indicated by the arrow back to element 750, attempts to place the request may continue until placement is successful. Although not illustrated in FIG. 7, in some embodiments, placement of resources may be optional (at least for a period of time) and thus if a rejection of an initial request to place the resource is received, placement of the resource may be aborted.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 8:
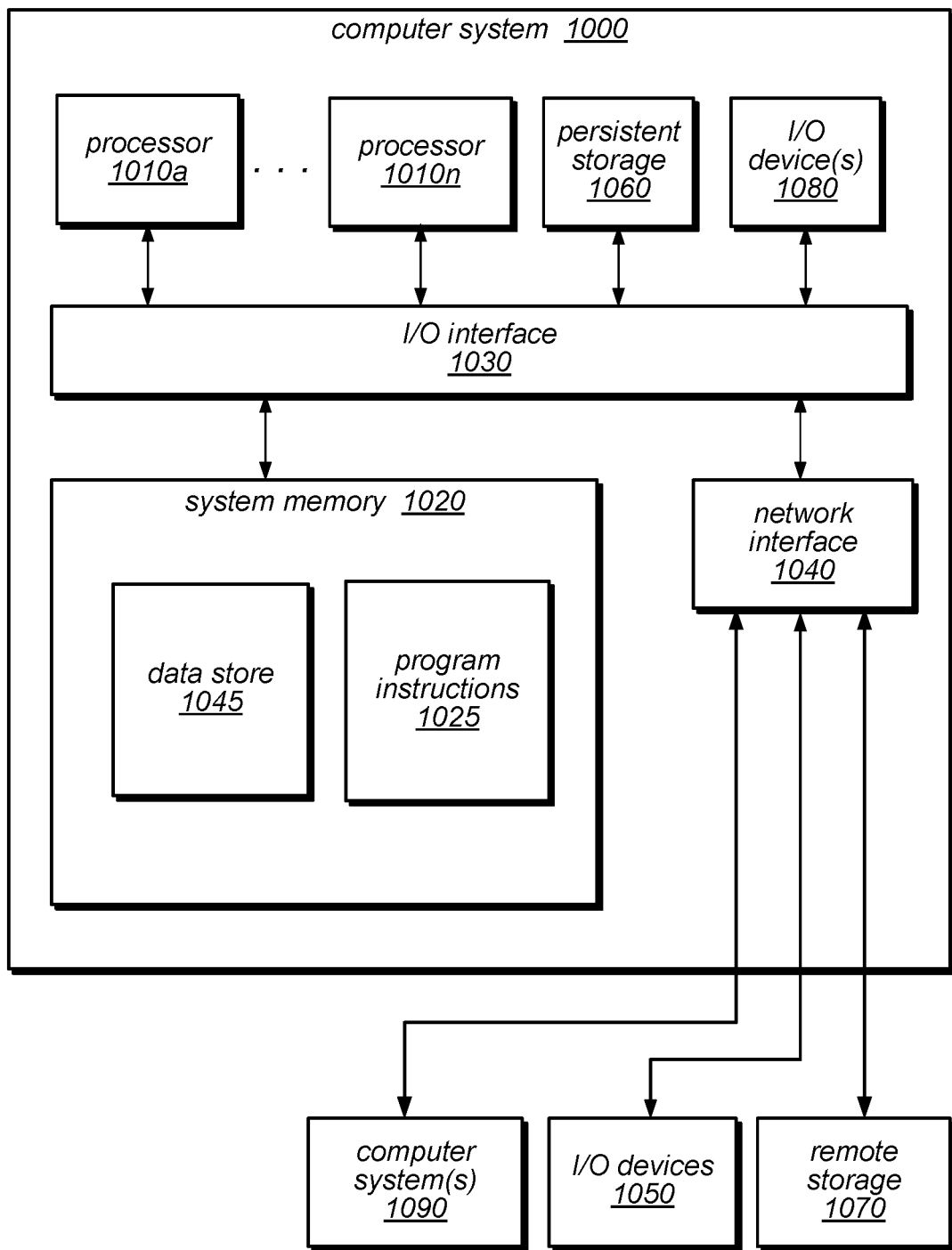
FIG. 8 is a block diagram illustrating an example computing system, according to some embodiments.

Embodiments of preventing concentrated selection for resource hosts for placing resources as described herein may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
a plurality of compute nodes, each comprising at least one processor and a memory, configured to implement a control plane and a plurality of resource hosts for the distributed system;
wherein the control plane is configured to:
for placement of a given resource:
identify from possible ones of the plurality of resource hosts a resource host for the given resource according to an evaluation of placement criteria with respect to the plurality of resource hosts; and
send a request to place the given resource to the identified resource host;
receive a response rejecting the request to place the given resource from the identified resource host; and
exclude the identified resource host from the possible ones of the plurality of resource hosts responsive to receipt of the response rejecting the placement request; and
wherein the identified resource host is configured to:
in response to the receipt of the request to place the resource:
identify criteria for rejecting the placement of the given resource at the identified resource host;
determine one or more load metrics for the identified resource host;
evaluate the one or more load metrics for the identified resource host with respect to the criteria to determine that the one or more load metrics satisfy the criteria for rejecting the placement of the resource; and
in response to the determination that the one or more load metrics satisfy the criteria, send a response comprising a rejection of the placement request to the control plane, wherein the response indicates that the given resource is not placed at the identified resource host.

2. The system of claim 1, wherein the control plane is further configured to determine the criteria for rejecting placement of the resource, wherein the criteria are included in the request sent to the resource host.

3. The system of claim 1, wherein the control plane is further configured to:
in response to the receipt of the response comprising the rejection of the request to place the resource at the resource host:
identify from the possible ones of the plurality of resource hosts another one of the plurality of resource hosts for placing the resource; and
send another request to place the resource at the other resource host, wherein the other request:
includes a different version of the criteria for rejecting the placement of the resource; or
does not include the criteria for rejection the placement of the resource.

4. The system of claim 1, wherein the distributed system is a network-based storage service, wherein the resource is a data volume persisted in the network-based storage service on behalf of a client of the network-based storage service, and wherein the network-based storage service is a virtual compute instance hosted at a network-based virtual compute service.

5. A method, comprising:
performing, by one or more computing devices:
determining a resource host out of possible ones of a plurality of resource hosts in a distributed system for placement of a resource according to an evaluation of placement criteria performed with respect to the possible ones of the plurality of resource hosts;

receiving, at the determined resource host, a request to place the resource at the determined resource host;

in response to receiving the request to place the resource at the determined resource host, performing by the determined resource host:

identifying criteria for rejecting the placement of the resource at the determined resource host;

evaluating one or more load metrics for the determined resource host with respect to the criteria to determine that the one or more load metrics satisfy the criteria; and in response to determining that the one or more load metrics satisfy the criteria, responding to the request to place the resource with a rejection for placing the resource, wherein the rejection indicates that the determined resource host rejects placement of the given resource; and in response to receiving the rejection for placing the resource, excluding the determined resource host from the possible ones of the plurality of resource hosts.

6. The method of claim 5, further comprising:

selecting, by a control plane of the distributed system, the criteria for rejecting the placement of the resource;

sending, by the control plane, the request to place the resource at the resource host, wherein the request includes the criteria; and wherein the determining a resource host out of the possible ones of the plurality of resource hosts is performed by the control plane.

7. The method of claim 6, wherein selecting the criteria for rejecting placement of the resource is based, at least in part, on at least one load metric obtained by the control plane from the resource host.

8. The method of claim 6, further comprising:

in response to receiving the rejection for placing the resource:

identifying, by the control plane, another one of the possible ones of the plurality of resource hosts for placing the resource;

determining, by the control plane, a different version of the criteria for rejecting the placement of the resource; and sending, by the control plane, the request to place the resource at the other resource host, wherein the request includes the different version of the criteria.

9. The method of claim 6, further comprising:

in response to receiving the rejection for placing the resource:

identifying, by the control plane, another one of the possible ones of the plurality of resource hosts for placing the resource; and sending, by the control plane, the request to place the resource at the other resource host, wherein the request does not include the criteria for rejecting the placement of the resource.

10. The method of claim 6, further comprising:

for placing another resource in the distributed system:

determining, by the control plane, another one of the plurality of resource hosts for placing the other resource according to an evaluation of the placement criteria performed with respect to the plurality of resources;

selecting, by the control plane, different criteria for rejecting the placement of the other resource; and sending, by the control plane, the request to place the other resource at the other resource host, wherein the request includes the different criteria.

11. The method of claim 5, further comprising determining the one or more load metrics based, at least in part, on different infrastructure localities that include the resource host.

12. The method of claim 5, wherein identifying the criteria for rejecting the placement of the resource at the resource host comprises selecting, by the resource host, the criteria.

13. The method of claim 5, further comprising:

receiving, at the resource host, another request to place another resource at the resource host;

in response to receiving the request to place the other resource:

determining, by the resource host, that an expected workload for placement of the other resource does not exceed an evaluation threshold for applying the rejection criteria; and in response to determining that the placement of the other resource does not exceed an evaluation threshold for applying the rejection criteria, responding to the other request with an acceptance for placing the other resource at the resource host.

14. A non-transitory, computer-readable storage medium, storing program instructions that when executed by one or more computing devices cause the one or more computing devices to implement a resource host of a distributed system configured to:

receive a request to place a resource at the resource host from a control plane implemented for the distributed system;

in response to receiving the request to place the resource:

identify criteria for rejecting the placement of the resource at the resource host;

determine one or more load metrics for the resource host;

evaluate the one or more load metrics for the resource host with respect to the criteria to determine that the one or more load metrics satisfy the criteria for rejecting the placement of the resource;

in response to determining that the one or more load metrics satisfy the criteria, send a rejection of the placement request to the control plane, wherein the rejection indicates that the resource host rejects placement of the resource; and in response to determining that the one or more load metrics do not satisfy the criteria, send an acceptance of the placement request to the control plane, wherein the acceptance indicates that the resource host places the resource at the resource host.

15. The non-transitory, computer-readable storage medium of claim 14, wherein the request to place the resource at the resource host comprises the criteria for rejecting the placement of the resource; and wherein the criteria for rejecting the placement of the resource is selected by the control plane.

16. The non-transitory, computer-readable storage medium of claim 14, wherein the one or more load metrics are determined, based, at least in part, on different infrastructure localities that include the resource host.

17. The non-transitory, computer-readable storage medium of claim 14, wherein:

placement of the resource at the resource host includes creating the resource from a remote source; and the resource host is further configured to:

receive a request to place another resource at the resource host from the control plane, wherein placement of the other resource does not include creating the resource from the remote source;

in response to receiving the request to place the other resource:

determine that the other resource is not created from the remote source; and in response to determining that the other resource is not created from the remote source, send an acceptance of the placement of the other resource to the control plane.

18. The non-transitory, computer-readable storage medium of claim 14, wherein the resource host is further configured to:

receive a request to place another resource at the resource host from the control plane, wherein the request includes different criteria for rejecting placement of the other resource;

in response to receiving the request to place the other resource:

evaluate the one or more load metrics for the resource host with respect to the different criteria to determine that the one or more load metrics do not satisfy the criteria for rejecting the placement of the resource; and in response to determining that the one or more load metrics do not satisfy the criteria, send an acceptance of the placement request to the control plane.

19. The non-transitory, computer-readable storage medium of claim 14, wherein the criteria for rejecting the placement of the resource comprise:

an I/O utilization threshold;

a processing utilization threshold;

a network utilization threshold; or a threshold for a number of resources currently being placed at the resource host.

20. The method of claim 5, further comprising:

in response to receiving the rejection for placing the resource:

determining that the placement of the resource is optional; and in response to determining that the placement of the resource is optional, aborting placement of the resource.

\* \* \* \* \*